(12) United States Patent
Kane

(10) Patent No.: US 7,297,934 B2
(45) Date of Patent: Nov. 20, 2007

(54) OPTICAL SYSTEM

(75) Inventor: David M. Kane, Rowley, MA (US)

(73) Assignee: Areté Associates, Sherman Oaks, CA (US)

( * ) Notice: Subject to any disclaimer, the term of this patent is extended or adjusted under 35 U.S.C. 154(b) by 100 days.

(21) Appl. No.: 11/151,594

(22) Filed: Jun. 13, 2005

(65) Prior Publication Data

US 2006/0006337 A1 Jan. 12, 2006

(51) Int. Cl.
*G01D 5/30* (2006.01)
*G01J 1/44* (2006.01)
*H01J 40/14* (2006.01)

(52) U.S. Cl. .................. 250/230; 250/206; 398/156; 356/139.01; 356/141.1

(58) Field of Classification Search ............. 250/206, 250/216, 230; 359/197–203, 212–217; 356/4.01–4.09, 356/131.01–13, 141.1–141; 398/118–131, 398/140–172, 202–214
See application file for complete search history.

(56) References Cited

U.S. PATENT DOCUMENTS

| | | | |
|---|---|---|---|
| 2,877,354 A | 3/1959 | Fairbanks et al. | |
| 3,644,043 A | 2/1972 | Jones et al. | |
| 3,961,179 A | 6/1976 | Kuffer | |
| 6,281,970 B1 | 8/2001 | Cooper et al. | |
| 6,700,606 B1 | 3/2004 | Borza | |
| 6,701,093 B1 * | 3/2004 | Gotoh et al. | 398/156 |

FOREIGN PATENT DOCUMENTS

| | | |
|---|---|---|
| CA | 2 311 163 A Y | 12/2000 |
| FR | 2 687 791 A-X | 8/1993 |
| WO | 98/13720 A-X | 4/1998 |
| WO | 98/13720 A Y | 4/1998 |

\* cited by examiner

*Primary Examiner*—Georgia Epps
*Assistant Examiner*—Patrick J. Lee
(74) *Attorney, Agent, or Firm*—Peter I. Lippman

(57) ABSTRACT

In preferred forms of the invention an array of MEMS mirrors or small mirrors inside an optical system operates closed-loop. These mirrors direct external source light, or internally generated light, onto an object—and detect light reflected from it onto a detector that senses the source. Local sensors measure mirror angles relative to the system. Sensor and detector outputs yield source location relative to the system. One preferred mode drives the MEMS mirrors, and field of view seen by the detector, in a raster, collecting a 2-D or 3-D image of the scanned region. Energy reaching the detector can be utilized to analyze object characteristics, or with an optional active distance-detecting module create 2- or 3-D images, based on the object's reflection of light back to the system. In some applications, a response can be generated. The invention can detect sources and locations for various applications.

47 Claims, 5 Drawing Sheets

OPTICAL SYSTEM

This document is based upon, and claims priority benefit of, International Application No. PCT/US03/39535; and in turn upon and of its precursor, U.S. provisional patent application 60/433,301—which are both wholly incorporated by reference herein.

RELATED DOCUMENTS

Closely related documents are other, coowned U.S. utility-patent documents and references—also incorporated by reference. Those documents are in the names of:
- Kane, provisional application Ser. 60/381,286, also incorporated by reference in the provisional application that is mentioned above;
- Kane et al., application Ser. No. 10/142,654 "HIGH-SPEED, LOW-POWER OPTICAL MODULATION APPARATUS AND METHOD".

FIELD OF THE INVENTION

This invention relates generally to systems and methods for automatically detecting light from an object, determining direction or other characteristics (such as distance, spectral properties, or an image) of the detected light or the object, and possibly responding to the detected light.

BACKGROUND

Some conventional systems and methods for accomplishing these goals rely upon scan mirrors that receive signals from an object and relay them into an aperture of an optical system—and, for response, conversely receive signals from the optical-system aperture and return those signals toward the object. Some such systems and methods instead (or also) rely upon gimbals that support and reorient the entire optical system. Both approaches entail relatively high moments of inertia, and accordingly large motors and elevated power requirements.

Such configurations require extremely adverse tradeoffs and compromises between, on one hand, undesirably high cost and size, and on the other hand structural weaknesses that lead to unreliability and even failure. For instance expensive custom parts and instrumentation are the rule rather than the exception, while some conventional devices have dimensions on the order of one to ten centimeters with mass of one to ten or even hundreds of kilograms.

These are significant handicaps for—in particular—devices that may be for use in airplanes and satellites. Even in these cases, such drawbacks might be acceptable if such systems provided superb performance, but unfortunately angular resolution in conventional systems of various types is generally no better than two-thirds of a degree—sometimes as coarse as ten degrees and more.

For example gimbal controls are most typically good to roughly one degree or less, although some units capable of precision in tens of microradians are available for millions of dollars each. Sensors using focal-plane arrays, e. g. quad cells, are typically precise to roughly ten degrees. Other nonmechanical systems include quad cells behind fisheye lenses.

The poor angular resolution and other performance limitations of such sensors arise in part from use of fixed, very large sensor assemblies, typically quad cells, CCD or CMOS arrays, at a focal plane—with fixed fields of view. These components accordingly also suffer from limited fields of regard. Furthermore the necessity for downloading into a computer memory the massive volumes of data from multimegabyte sensor arrays makes the frame rate of these systems extremely slow.

In efforts to improve the field of regard, the large areal arrays are sometimes placed behind radically wide-angle lenses, even fish-eye lenses. This strategy, however, is counterproductive in that it only compounds the data-download problem, while also yielding intrinsically coarse angular resolution and very nonlinear angular mapping.

In other words these systems are squeezed between the need for high resolution and the need for broad field of regard; this squeeze comes down to an all-but-prohibitive demand for dynamic range, or bandwidth. Data congestion, furthermore, is doubly problematic because in these systems the entire contents of every frame must be retrieved before that frame can be searched for an optical source of interest.

One rather unnoticed contributor to inadequate dynamic range is the direct relationship between gimbal angle or scan-mirror angle and excursion of the beam in the external scanned volume. That relationship is a natural one-to-one for a gimbal system, and one-to-two for a rotating mirror. Since the direct effect of mechanical rotation is relatively slow for gimbals, and relatively limited in overall angular excursion for scan mirrors, the external beam-angle excursion is either slow or limited, or both.

In attempts to mitigate low resolution and frame rate, some workers have proposed to substitute a so-called "position-sensing detector" (PSD) for the commonly used larger arrays. The advantage of a PSD—which is a unitary device, not an array—is that it inherently locates and reports position of only a detected optical source, not an entire scene, and thus requires download of only a far smaller amount of data.

Another inherent advantage of a PSD is that it provides a continuous, analog positional readout, intrinsically yielding extremely high resolution. The report from an array is instead quantized by the pixel (or "aliasing") effect that is central to any kind of array detection.

The PSD reports position on its own sensitive surface, in units of distance from its nominal center along two orthogonal axes. To find angular mapping, typically these off-center coordinates are divided by the focal length of a final focusing element.

Unfortunately these reported distances and therefore the angular mapping of a PSD are nonlinear, to the extent of several percent at the PSD edges—aggravating the analogous handicap introduced by a fish-eye or other wide-angle lens—and are also temperature sensitive. The detector may report accurately that an optical source has been sensed, but fail to report accurately where that object is, unless it is near the nominal center, or origin of coordinates.

It might be supposed—although in actuality this supposition is well beyond the present state of the art, and artisans of ordinary skill—that such a system could be quickly turned to look directly at the candidate object, for a more-accurate assessment of position. In any conventional detector, however, this solution is impractical due to the lumbering response of an associated gimbal system, or even of a scan mirror that is redirecting the light into the detector aperture.

Often it is desirable to know something more about an optical source that has been noticed—the character of the light itself, and any intelligence signal that may be impressed upon that light. Accurate determination of wavelength and frequency modulation information, as may be gleaned from the foregoing discussion, is beyond the capabilities of these systems. Similarly infeasible is any exploration of physical objects that may be associated with the optical source.

The intractability of attempting to operate with such systems may be clarified by consideration of some practical situations which call for use of optical sensors. In most applications a person or an apparatus points a light source toward, most typically, some sort of vehicle—to guide an object in an attempt to rendezvous with the vehicle. Commonly the intention is adversarial, as for example damage to the vehicle; while the optical-sensor apparatus is mounted on the vehicle and its purpose is to detect the presence of the light beam and initiate some protective response.

Such response, usually intended to produce confusion as to the exact location of the vehicle, sometimes takes the form of returning a literally blinding flash of light toward the person or apparatus that is pointing the original source, to temporarily dazzle and confuse that source-controlling entity. Alternatively a response can be to eject from the vehicle many particles that strongly reflect the guide light, to instead confuse directional-control mechanisms of the moving object. Accompanying either of these may be an entirely different kind of response, namely an effort to disable the source-pointing person or apparatus, or the object. Such a disabling response, directed toward the object or source, may take the form of either a physical article or of powerful radiation. Still another desirable kind of response would be investigatory, i.e. determining the character of the guide beam or of the guided object; such information can be used to determine and report the nature of the guiding system itself, either for purposes of immediate efforts to confuse and avoid or for future protective-design work.

The person or apparatus pointing the source may be adjacent to the initial position of the object. In a sense this is the easiest case from the standpoint of protective response, because the source can be treated as a beacon for guidance of a disabling response that eliminates both the light source and the object—if the response is sufficiently prompt, so that the source and object are still not only in-line but also relatively close together. In another sense, however, this is a difficult case from the standpoint of confusion, because the object may have been designed to look (for its guidance) backward at the source rather than forward at the vehicle—in which event the ejection of reflecting particles cannot confuse the directional-control mechanisms of the object, as long as the pointing entity can keep the vehicle in view.

The person or apparatus pointing the source may, however, instead be at a different position—off to the side from the path of the object, and from a line between the source and the object. In this event, disabling both the source and object with a single response is not possible; but at least confusion can be more-readily produced since the object is necessarily designed to look forward at the vehicle, so that either the dazzling or the decoy-particle strategy, or both, can be effective.

One type of movable-mirror device that is known in various kinds of optical-detection systems is a single scan mirror of about 25 or 30 mm or more, consistent with the earlier statement of dimensions for conventional systems. Such mirrors are too bulky and heavy to overcome the previously discussed problems of response speed.

Another type of known movable-mirror device is a spinning cylinder with multiple mirrors carried on its outer surface. Such a polyhedral construction does provide a movable mirror, sometimes disposed along an optical path between a detector and an entrance aperture. Dimensions of each of the mirrors in such a device are typically in the tens of millimeters, also consistent with the previous indication of representative dimensions for conventional systems. Hence the overall device and even the individual mirrors are too big and heavy to free the optical-detection art from the response-speed and related limitations discussed above. These mirror wheels are ordinarily made to spin continuously; hence the individual mirrors of such an array lack independent maneuverability for customized control movements. Accordingly they are poorly suited for practical use in rapid detection and tracking of a particular source object.

Also of interest are telescopes—including astronomical telescopes—particularly of the type that has a movable mirror positioned between an entrance aperture and a detector. For present purposes, however, any interest in such devices is academic, as the movable components are relatively huge and far too massive to be useful in any rapid-response system. Even more relevant is the typical limitation of field of view, in telescopes, to less than ten degrees.

Smaller deformable mirrors, too, are sometimes placed within optical systems in positions such as just described. A device of this type generally comprises a continuous reflective membrane that is controllably bent and distorted to correct wavefront errors. Such mirrors are typically at least 20 to 30 mm across.

Another type of known moving-mirror device, never heretofore associated with the field of optical-source detection that is under consideration here, is called a "microelectromechanical system" (MEMS) mirror. Such devices, introduced some years ago by the Texas Instruments Company, and more recently in versions produced by Lucent Technologies and called an "optical switch", most commonly take the form of arrays of very small mirrors—each on the order of ten to 500 microns across. At least in principle individual mirrors can be made available in the same format. In use these devices, while some are capable of continuous positional control, are most often only bistable, used for switching in optical information networks and also in an image-projection system for personal computers.

Other familiar optical devices, not previously associated with the present field, are afocal lens packages used e.g. as lens focal-length extenders. These are commonplace in ordinary cameras.

Almost all the optical devices discussed above, and most conspicuously the astronomical ones and MEMS devices, are known only in different fields from the present invention.

As can now be seen, the related art fails to resolve the previously described problems. The efforts outlined above, although praiseworthy, leave room for considerable refinement.

SUMMARY OF THE DISCLOSURE

The present invention introduces such refinement. The invention has several major facets or aspects, which can be used independently—although, to best optimize enjoyment of their advantages, certain of these aspects or facets are best practiced (and most-preferably practiced) in conjunction together.

In preferred embodiments of all the major independent facets or aspects treated in this document, the invention is an optical system for dynamically determining radiation characteristics, including associated angular direction, of an external article in a volume outside the optical system. The optical system itself includes an optical detector and an entrance aperture.

It also includes an afocal element for changing the size of the field of regard ("FOR") of such external article and such volume as seen by the detector. Further included, disposed along an optical path between the detector and the entrance aperture, is at least one mirror that is rotatable about plural axes, for causing the detector to address varying portions of the volume outside the optical system.

Again, the above-introduced features are conmion to all the major independent aspects or facets of the invention presented in this document. Next the major independent facets will be taken up in turn, one at a time.

In its first major independent facet or aspect, the determination of associated angular direction is performed throughout a specified range of angular directions. Further, the afocal element is associated with the aperture—and the FOR size change as seen by the detector is an enlargement.

Each mirror of the at least one mirror has dimensions in a range from thirty microns to five millimeters. Due to the enlarging of the FOV together with rotation of the at least one mirror, such external article is visible to the detector throughout the specified range, substantially without changing magnitude of the enlarging.

The foregoing may represent a description or definition of the first aspect or facet of the invention in its broadest or most general form. Even as couched in these broad terms, however, it can be seen that this facet of the invention importantly advances the art.

The specified mirror position, between detector and aperture, can also be described as within or inside the optical system. Steering the incoming radiation beam (i.e., maneuvering the sensitivity direction of the system) from within the system produces opportunities to obtain very large optical leverage, as compared with turning the entire system on gimbals or steering with mirrors external to the system. That is, the angle through which the beam outside the system turns can be made much larger than that through which the beam inside the system turns. (The latter angle is twice that through which the mirror turns.)

In addition the beam cross-section inside the optical system is generally smaller than outside. Hence smaller, lighter optical elements can be used, and this in turn means greater response speed with less power. The particularly small mirrors, mentioned above, of the first main aspect of the invention are especially nimble—still further enhancing the inherent benefits of this aspect of the invention.

Such mirrors can make extremely rapid and agile steering of a detection beam very straightforward. Response time of individual mirrors with low mass and size is excellent. Continuous maneuverability about two orthogonal axes can be made not only smooth and orderly over the full range of operation, but also highly reproducible—so that angular position as a function of mirror-position feedback signals (e.g. from embedded capacitive sensors) can be calibrated and thereafter all mirror angles known very precisely from instantaneous feedback signals.

Heretofore very small mirrors have ordinarily been used in only a binary or bipolar mode for optical switching in conmiunications and in computerized image-projection systems. They have not been used in spatially-continuous, or substantially continuous, positional control of optical beams. Thus as mentioned previously, the examples of earlier optical systems using internal mirror positioning are so-called "nonanalogous arts". In other words, they are not in the same field as the present invention.

It is especially advantageous that an external article is visible to the detector throughout the specified range, substantially without adjusting the enlargement introduced by the afocal element. This feature very greatly simplifies the interpretation of signals that establish the exact location of each external article that is detected; and—as will be seen—is also extremely useful in facilitating the detection and tracking of more than one article concurrently.

Although the first major aspect of the invention thus significantly advances the art, nevertheless to optimize enjoyment of its benefits preferably the invention is practiced in conjunction with certain additional features or characteristics. In particular, preferably each mirror of the at least one mirror is a microelectro-mechanical mirror.

Preferably the afocal element is an afocal lens assembly disposed at the aperture, that amplifies the varying introduced by the at least one mirror. If this basic preference is observed, then a subpreference is that the afocal lens assembly not focus the external article onto any solid element of the optical system; and that the system further include a focusing lens, associated with the detector, for:

intercepting a radiation beam that has passed through the afocal lens assembly, and that also has been reflected by the at least one mirror, and focusing rays, in said radiation beam, from the external article onto the detector.

Three other basic preferences are that the afocal enlarging element be disposed generally at the aperture, that it define the aperture, and that the system further include one or more additional subsystems or modules. The invention contemplates a broad variety of such modules or subsystems, such as:

an imaging module—in which case the afocal enlarging element and the at least one mirror are shared by both the imaging module and the detector with its focusing lens;

a spectral-analysis module—in which case the afocal enlarging element and the at least one mirror are shared by both the spectral-analysis module and the detector with its focusing lens;

an auxiliary optical system that includes at least one of (1) a ranging laser for projecting a ranging beam to the article, and (2) a ranging-laser receiving module, distinct from the previously mentioned detector with its focusing lens, for receiving and analyzing the ranging beam after reflection from the article—in which case the afocal enlarging element and the at least one mirror are shared by both: one or both of the ranging laser and receiving module, and the detector with its focusing cusing lens;

an auxiliary optical system that includes at least one of a communication-beam transmission module for transmitting a first modulated communication beam toward the article, and a communication-beam reception module, distinct from the previously mentioned detector with its focusing lens, for receiving and interpreting a second modulated communication beam received from the article or from a region of the volume that includes the article—in which case the afocal enlarging element and the at least one mirror are shared by both: one or both of the transmission and reception modules, and the detector with its focusing lens;

an auxiliary optical system that includes at least one of a communication-beam transmission module for transmitting a first modulated communication beam toward the article, and a communication-beam reception module for receiving and interpreting a second modulated communication beam received from the article or from a region of the volume that includes the article—in which case the afocal enlarging element and the at least one mirror are shared by one or both of the transmission and reception modules;

a powerful laser for projecting a beam to impair function or structural integrity of the article—in which case the afocal enlarging element and the at least one mirror are shared by both the powerful laser and the detector with its focusing lens; and/or a laser for dazzling or confusing either a human operator or optical apparatus associated with the article, or both—in which case the afocal enlarging element and the at least one mirror are shared by both the dazzling laser and the detector with its focusing lens.

In still another basic preference, the detector reports relative location of radiation incident on a sensitive surface of the detector; and the system further includes some means for automatically responding to the detector by actively servocontrolling the at least one mirror to substantially center an image of a detected source on the detector. In event this preference is observed, then a series of nested subpreferences comes into play:

Preferably the external article includes a radiation source of a particular type, the "characteristics" include existence and presence of the source, and the optical system is for detecting the source and determining its angular location, and the opti- cal detector is a detector for the radiation from the source of the particular type; and the system further includes some means for automatically responding to the detector by actively servocontrolling the at least one mirror to substantially center an image of a detected source on the detector.

In this case, preferably the system further includes some means for reading and interpreting angular position from mirror position feedback signals while the image is substantially centered on the detector.

If so, then the next nested preference in order is that preferably the responding means in turn include some means for continuing to servocontrol the at least one mirror to track the already-detected source substantially at the detector center.

If this preference too is observed, then further preferably the at least one mirror includes plural mirrors; and the continuing means include means for using one or more mirrors to track the already-detected source, and one or more other mirrors to in- stead simultaneously perform another function.

If this plural-mirror preference, too, is observed, then preferably the so-called "other function" includes searching for another source, previously not yet detected.

Also in case of the plural-mirror preference, it is also preferred that the other function include operating the auxiliary optical system with respect to said already-detected source or another article or scene.

In event the above-mentioned continuing-servocontrol preference is in effect—so that the already-detected source is still being tracked—it is also preferable that the invention further include operating a beam-splitter to enable use of an auxiliary optical system, with respect to the already-detected source or another article or scene, simultaneously with that continuing tracking of the already-detected source.

Still as to the first main facet of the invention, four additional basic preferences will be mentioned. It is preferred that the detector be a position-sensing detector (PSD)—or, as an alternative preference, a quad cell. It is also preferred that the system further include some means for substituting a detector array for the detector—to image the already-detected source or associated articles, or both.

Yet another basic preference is that the system further include some means for directing a response toward the detected article or an article associated therewith, or both. In this case, a further subpreference is that the response-directing means include some means for emitting a beam of radiation that uses the "entrance aperture" as an exit aperture and is reflected from the at least one mirror. Here the response-directing means share, with the radiation from the source, both the entrance aperture and the at least one mirror.

Now turning to a second major independent facet or aspect of the invention, in preferred embodiments of this second aspect the above-enumerated common characteristics are present as already stated. Not all the features of the first facet, however, are included in the second facet.

On the other hand, some features of the first facet are present. In particular, the determination of angular direction is performed throughout a specified range of such direction; the afocal element is associated with the aperture; and the apparent FOR size change is, specifically, an enlargement.

Some features are present here that are not in the first facet. In particular, in preferred embodiments of this second aspect of the invention, the afocal element does not focus the external article onto any solid element of the optical system. A further feature is that, explicitly, the detector addresses varying portions of the external volume with the enlarged FOR produced by the afocal element.

Moreover, in the second aspect there is a focusing lens associated ated with the detector. This lens is for intercepting a radiation beam that has passed through the afocal element, and that also has been reflected by the at least one mirror.

The lens is also for focusing rays, in the radiation beam, from the external article onto the detector. That is to say, the afocal element and mirror cooperate with the focusing lens, to image the article—with its enlarged FOR—onto the detector. This cooperative arrangement might be loosely described as focusing external articles on the detector by relay.

The foregoing may represent a description or definition of the second aspect or facet of the invention in its broadest or most general form. Even as couched in these broad terms, however, it can be seen that this facet of the invention importantly advances the art.

In particular, following sections of this document will make clear that focusing on the detector "by relay" as noted above, rather than directly by the afocal element, has two highly advantageous effects:

it keeps the afocal element free to do its job of enlarging the FOR, in coopration with the rotating internal mirrors; and at the same time enables the use of any one of several diverse detector types that make the optical system a very versatile and thus powerful tool—certain of these types, in particular, being especially potent in guiding the optical system to swiftly home in on an object anywhere in the FOR.

Although the second major aspect of the invention thus significantly cantly advances the art, nevertheless to optimize enjoyment of its benefits preferably the invention is practiced in conjunction with certain additional features or characteristics. In particular, three basic preferences are that the afocal enlarging element be disposed generally at the aperture, or define the aperture; or that the system further include an imaging module and the afocal enlarging element and at least one mirror be shared by both the imaging module and the detector with its focusing lens.

It is further preferred that each mirror of the at least one mirror have dimensions in a range from thirty microns to five millimeters. This last-mentioned preference holds for all the other preferred forms of the invention as well.

Another basic preference is that the system further include a spectral-analysis module. In this case the afocal enlarging element and the at least one mirror are shared by both the spectral-analysis module and the detector with its focusing lens.

It is yet further preferred that the system also include an auxiliary optical system that includes at least one of a ranging laser for projecting a ranging beam to the article, and a ranging laser receiving module, distinct from the previously mentioned detector with its focusing lens, for receiving and analyzing the ranging beam after reflection from the article. Furthermore here the afocal enlarging element and the at least one mirror are shared by both: one or both of the ranging laser and receiving module, and the detector with its focusing lens.

Another preference is that the optical system further include an auxiliary optical system that includes at least one of a communication-beam transmission module for transmitting a first modulated communication beam toward the article; and a communication-beam reception module, distinct from the detector with its focusing lens, for receiving and interpreting a second modulated communication beam received from the article or from a region of the volume that includes the article. Here, furthermore, the afocal enlarging element and the at least one mirror are shared by both: one or both of the transmission and reception modules, and the detector with its focusing lens.

In another preference, the optical system further includes a powerful laser for projecting a beam to impair function or structural integrity of the article. The afocal enlarging element and the at least one mirror are shared by both the powerful laser and the detector with its focusing lens.

An additional preference is that the system further include a laser for dazzling or confusing either a human operator or optical apparatus associated with the article, or both. The afocal enlarging element and the at least one mirror are shared by both the dazzling laser and the detector with its focusing lens.

In a further preference, the detector reports relative location of incident radiation on a sensitive surface of the detector. The system further includes some means for automatically responding to the detector by actively servocontrolling the at least one mirror to substantially center an image of a detected source on the detector.

In preferred embodiments of its third major independent facet or aspect, again the previously enumerated common features are all present. Additionally, as in the second facet, the afocal element does not focus the external article onto any solid element of the optical system; and the system includes a focusing lens, associated with the detector.

Here too, that lens is for intercepting a radiation beam which has passed through the afocal element, and that also has been reflected by the at least one mirror, and for focusing rays, in said radiation beam, from the external article onto the detector. The afocal element and mirror cooperate with the focusing lens and detector, to image the article onto the detector.

In this third main facet of the invention, however, the apparent FOR size change (as seen at the detector) which is produced by the afocal element is a reduction. (It is opposite in effect to the enlargement discussed above for the second facet.) In other words, the afocal element is designed and disposed to reduce rather than enlarge the field of regard.

Hence the at least one mirror causes the detector to address the exterior-volume portions with the reduced field of regard produced by the afocal element, and the focusing lens intercepts the beam after the beam has passed through the reducing element. Further, the rotatable mirror cooperates with the afocal reducing element to image the article onto the detector.

The foregoing may represent a description or definition of the third aspect or facet of the invention in its broadest or most general form. Even as couched in these broad terms, however, it can be seen that this facet of the invention importantly advances the art.

In particular, although reducing rather than enlarging the field of regard as seen by the detector cannot provide very large effective overall FOR, it can provide significantly finer pointing precision and accuracy. At the same time, other benefits of the second aspect of the invention apply here too—in particular the facilitation of many different kinds of detectors, especially including pointing systems.

These benefits of the third aspect of the invention can be exploited—in parallel with the first and second aspects, if desired —to accomplish both very large FOR and very fine directional determinations.

Although the third major aspect of the invention thus significantly advances the art, nevertheless to optimize enjoyment of its benefits preferably the invention is practiced in conjunction with certain additional features or characteristics. Only a few such complementary features will be outlined here.

In particular, preferably the system further includes an auxiliary optical system that includes at least one of a communication-beam transmission module for transmitting a first modulated communication beam toward the article, and a communication-beam reception module, distinct from the detector with its focusing lens, for receiving and interpreting a second modulated communication beam received from the article or from a region of the volume that includes the article. In such a system the afocal reducing element and the at least one mirror are shared by both the detector with its focusing ing lens and one or both of the transmission and reception modules.

Another preference is that each mirror of the at least one mirror have dimensions in a range from thirty microns to five millimeters. Still another preference is that the detector report relative location of incident radiation on a sensitive surface of the detector; and the system further include some means for automatically responding to the detector by actively servocontrolling the at least one mirror to substantially center an image of a detected source on the detector.

Yet another preference is that the optical system further include an auxiliary optical system that has an imaging reception module, distinct from the detector with its focusing lens, for receiving and interpreting an image beam received from the article or from a region of the volume that includes the article The afocal reducing element and the at least one mirror are shared by both the detector with its focusing lens and the imaging reception module.

It is to be understood that the foregoing enumeration of preferences is intended to be representative, not exhaustive. Thus many preferred forms of the invention set forth in the following detailed description or claims are within the scope of the present invention.

All of the foregoing operational principles and advantages of the invention will be more fully appreciated upon consideration of the following detailed description, with reference to the appended drawings, of which:

DETAILED DESCRIPTION OF THE PREFERRED EMBODIMENTS

Figure 1:
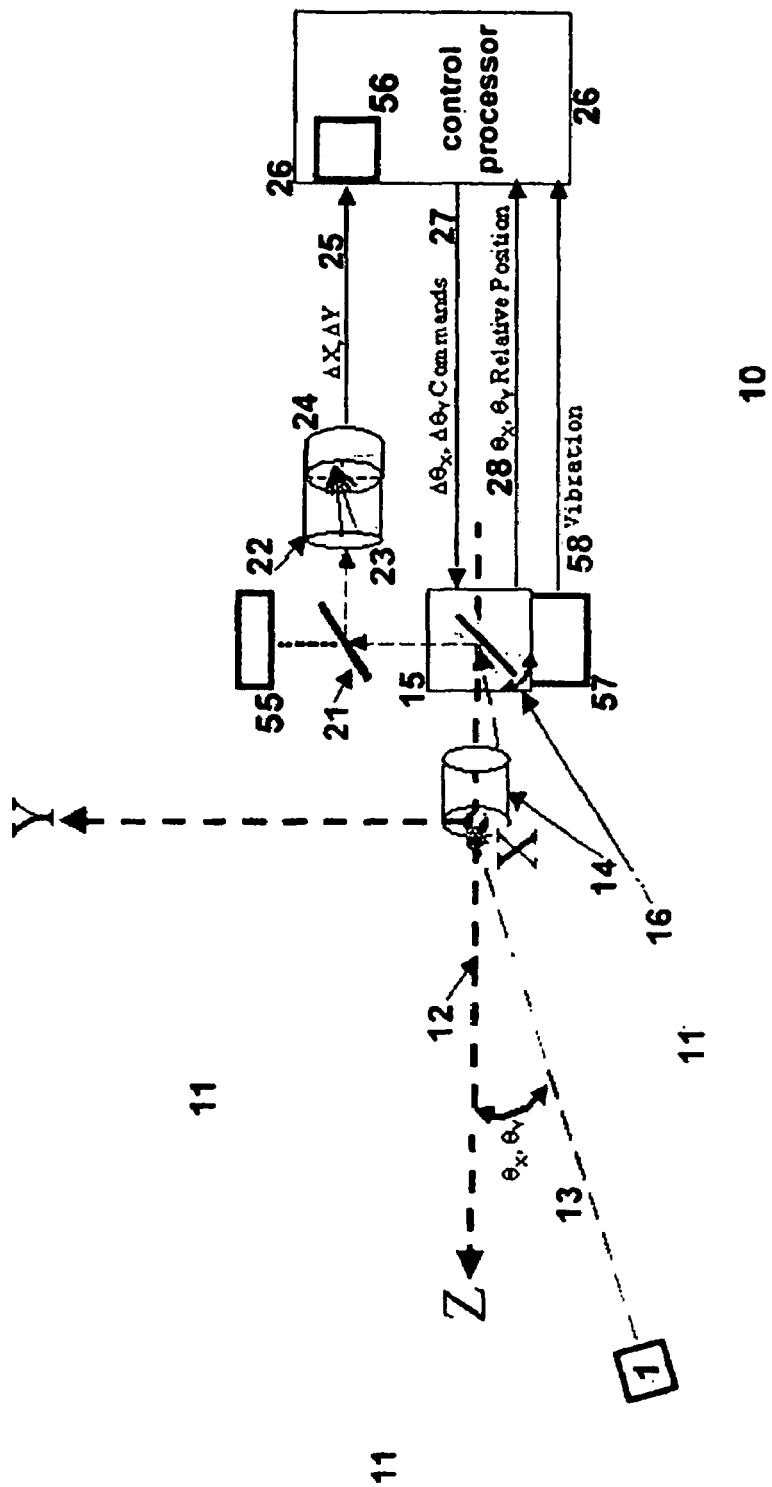
FIG. 1 is a block diagram, with most portions symbolically in side elevation but certain other portions (an aperture-lens assembly 14 and a lens/detector assembly 22) symbolically in isometric projection, of a basic first function—namely, a detection function—for preferred apparatus embodiments of the invention.
Figure 2:
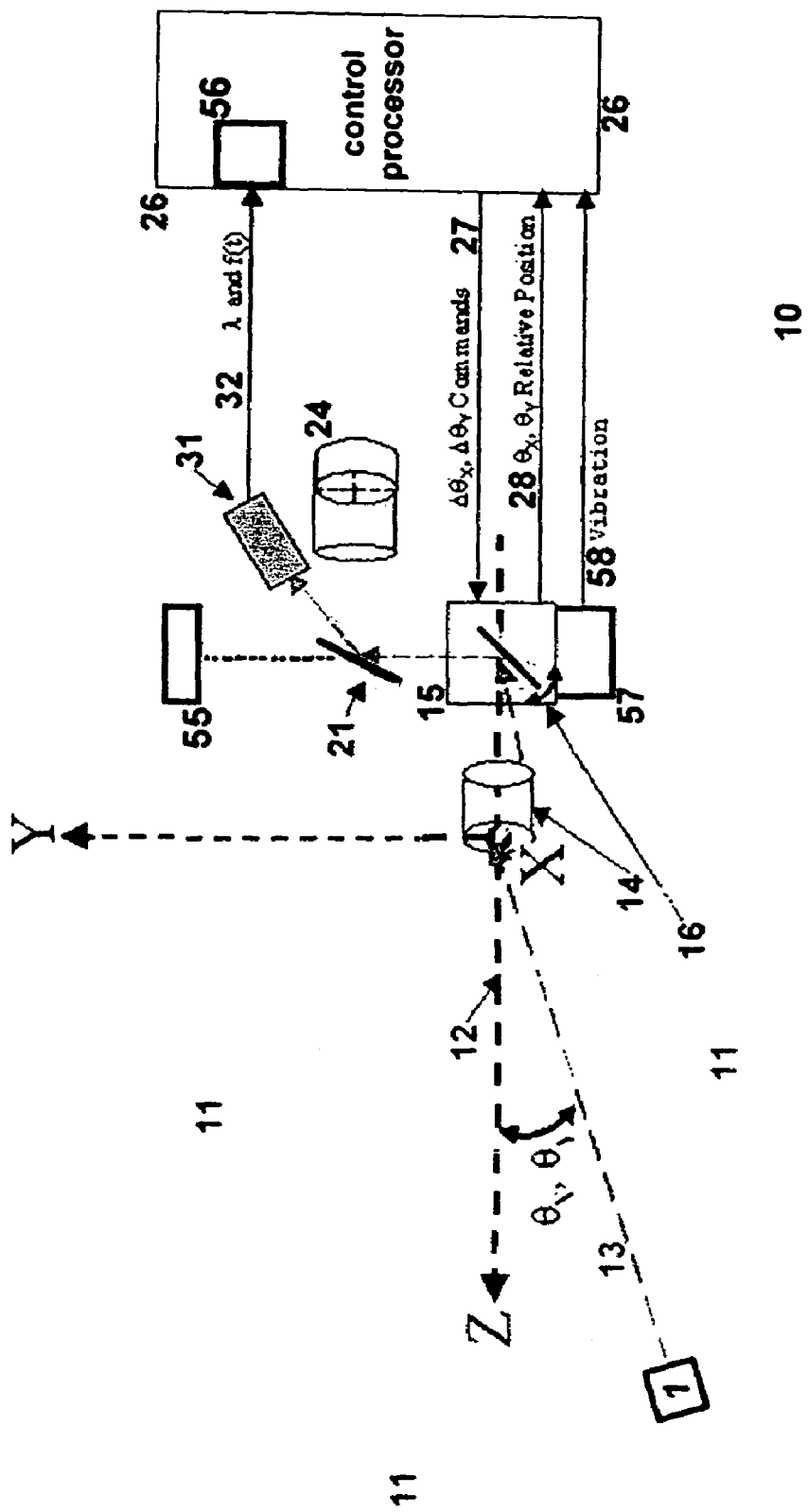
FIG. 2 is a like diagram showing an extension of preferred apparatus embodiments to encompass a second function, namely optical analysis.

In preferred embodiments, the invention provides a low-cost sensor system 10 (FIG. 1) capable of detecting and locating active illumination sources—or objects illuminated by such sources. In some preferred embodiments (FIGS. 2 through 4), the sensor system of the invention can also respond to the detected light source by returning a light beam 38 (FIG. 3) or an object, and in some cases by initiating a distance-determining or other investigation (Function 4, FIG. 4) of the source or objects associated with the source.

In particularly preferred embodiments, initial detection of a radiation source or illuminated object is qualified by filters that implement expectations as to the characteristics of such sources or objects that are of interest. For instance, when anticipated sources are infrared, or are in other particular spectral regions, spectral filters are placed at convenient positions in the optical path —usually but not necessarily associated with the fold mirror 21, and in particular taking the form of bandpass optical reflection/-transmission filters.

As mentioned elsewhere in this document, for various purposes the fold mirror can be advantageously implemented as a beam spliter, and incident-beam selectivity is simply an additional one of such purposes. In such arrangements, if it is preferable that certain spectral components of the beam not pass to the primary directionality detector 24, a dichroic or other bandpass or bandblocking filter can be used, as an alternative to a fold mirror 21. The filter transmits these undesired components to a radiation sink or auxiliary detection and imaging system 55, while reflecting the desired radiation components to the detector—or conversely, depending on preferred system configuration.

Such advance filtering is not limited to spectral characteristics. Merely by way of example, if anticipated sources are modulated temporally, the signal 25 from the optoelectronic detector 24 is advantageously filtered electronically 56 to exclude d. c. sources or sources having no significant bandwidth activity above a specific threshold frequency—or, more restrictively, to pass only a. c. signals having a particular specified modulation pattern or class of patterns.

Ideally the system detector 24 is a PSD, which has the ability to report positional coordinates $\Delta X$, $\Delta Y$ (on the PSD's own surface, FIG. 5) of an impinging optical beam from a source 1 in a region without the necessity of scanning the region. As noted elsewhere in this document, it is also necessary to determine the mirror position. From these data and known characteristics of the associated optics, as explained above, angular position $\theta_x$, $\theta_y$ of the source is readily calculated.

As mentioned earlier, however, a PSD is nonlinear and temperature sensitive when measuring large offaxis coordinates $\Delta X$, $\Delta Y$ and thus angles $\theta_x$, $\theta_y$. These drawbacks are neutralized, in preferred forms of the present invention, by operating in a null-balance mode as detailed below—so that the system relies on the PSD primarily only to determine whether the source is off axis and, if so, then in which direction; and not for quantitative reporting of large offaxis coordinates or their associated angles.

After the sensor system (including the arithmetic preprocessing mentioned earlier) has determined initial values for the incident angles $\theta_x$, $\theta_y$, the system very rapidly servocontrols itself to keep incident rays 13 at the center of the detector field. Most preferably such servocontrol 27 is implemented by one or more microelectromechanical (MEMS) mirrors 15 disposed inside the optical system 10, i.e. along the optical path between the detector 24 and the collecting aperture 14, 45 (FIG. 5) of the system.

Such mirrors have extraordinarily low mass and inertia, and corresponding extremely high response in earlier systems. Placing the mirror or mirrors inside the system gains yet further advantages of angular displacement speed, in the visible volume 11 of space outside the optical system, particularly if a lens 45 is placed at the aperture to optically magnify the angular displacement of the mirrors.

This particular arrangement for servocontrol of the incoming light, to center the beam on the detector, is particularly advantageous when using a PSD. Whereas that type of detector measures large off-axis angles somewhat inaccurately, the system is easily made extremely accurate in measuring the angular correction 28 applied by the MEMS system to bring the source to the central, null position.

Throughout most of this document, for purposes of simplicity the notation "$\theta_x$, $\theta_y$" has been used to represent both the off-axis angle of the beam 13 (FIG. 1) and the mirror-orientation 16 signals 28 relative to nominal or rest positions of the mirror or mirrors 15. As will be understood, these two different sets of angles 13, 28 are not at all the same—but when the system has servocontrolled itself to null the incident beam at the center of the detector 24, the two sets are related by straightforward transforms. Such transforms include the magnification factor introduced by the afocal package 14, as discussed at length elsewhere in this document, and also include the local calibration of the mirror actuatorstem positions relative to an internal standard, and also distortion in the afocal array 14 as well as the final focusing optic 23, and so forth.

The PSD itself can effectively monitor a far larger angular region 11 than it can image. This is a major advantage never fully exploited in conventional systems because of failure to use internal mirrors, or very small mirrors, and because of failure to servo the input source to a reproducible center-point on the detector.

Nevertheless a still further major advantage is gained by raster scanning 16 the PSD. The basic principle behind this is that the system views a small part of the field of regard at any instant in time, yet expands its coverage by searching for incident rays, thereby covering the entire field of regard 11.

As will be seen, practical field of view using the various forms of the invention can range, respectatively, from 20° to 180°.

This combination of the intrinsic angular-dynamic-range advantage of the PSD with the multiplicative advantage of a raster scan yields an anormous bandwidth, or bit depth, in overall determination of optical-source angular location $\theta_x$, $\theta_y$. Moreover, once a light sourec 1 is detected and the MEMS mirrors operated by a processor 26 to center the source in the detector field, advantageously the processor sends the MEMS mirrors further signals to continue seraching/scanning 16 in the general area of the detected rays—without losing the benefit of having the source near the detector center, where moderate angular accuracy is available. (Alternatively the native angular range of the PSD can be used for this purpose without additional mirror scanning.)

The optical system has been successfully servocontrolled to an incident ray when both coordinates ΔX and ΔY (FIG. 5) of the ray on the sensitive detector surface are zero as measured by the two-dimensional ("2-D") detector assembly (or on the case of a 1-D detector, when ΔX or ΔY is zero and the scan-mirror positions are noted). Once the system is servoing to the incident ray, as noted above it can function to determine not only angular location of the incident ray but also its wavelength λ and coded temporal modulation f(t); or can direct similar or different light rays 35-38 (FIG. 3) opposite the incident rays 13 along the same path, or laterally 43 with respect to that path—for communications, distance determination, optical enhancement or other purposes. In the case of light rays received from an adversary for guiding an object with destructive intent, an auxiliary laser 42 can be directed 41 to emit a very bright beam 43 of identical wavelength wavelength λ and temporal modulation f(t) onto a nearby (but progressively diverging) surface. This arrangement can closely mimic the original beam but in a different guiding location, and thereby draw off the object from the intended destination.

Various arrangements can be used to bring the auxiliary laser into optical alignment. One such arrangement is a variable-position fold mirror 21, 21' (FIGS. 2, 3 and %); however, for simultaneous operations as noted earlier such a mirror can be replaced by a beam splitter, e.g. a polarized one for maximum radiation transfer, or by spectral-bandwise splitting devices such as dichroic filters.

Figure 4:
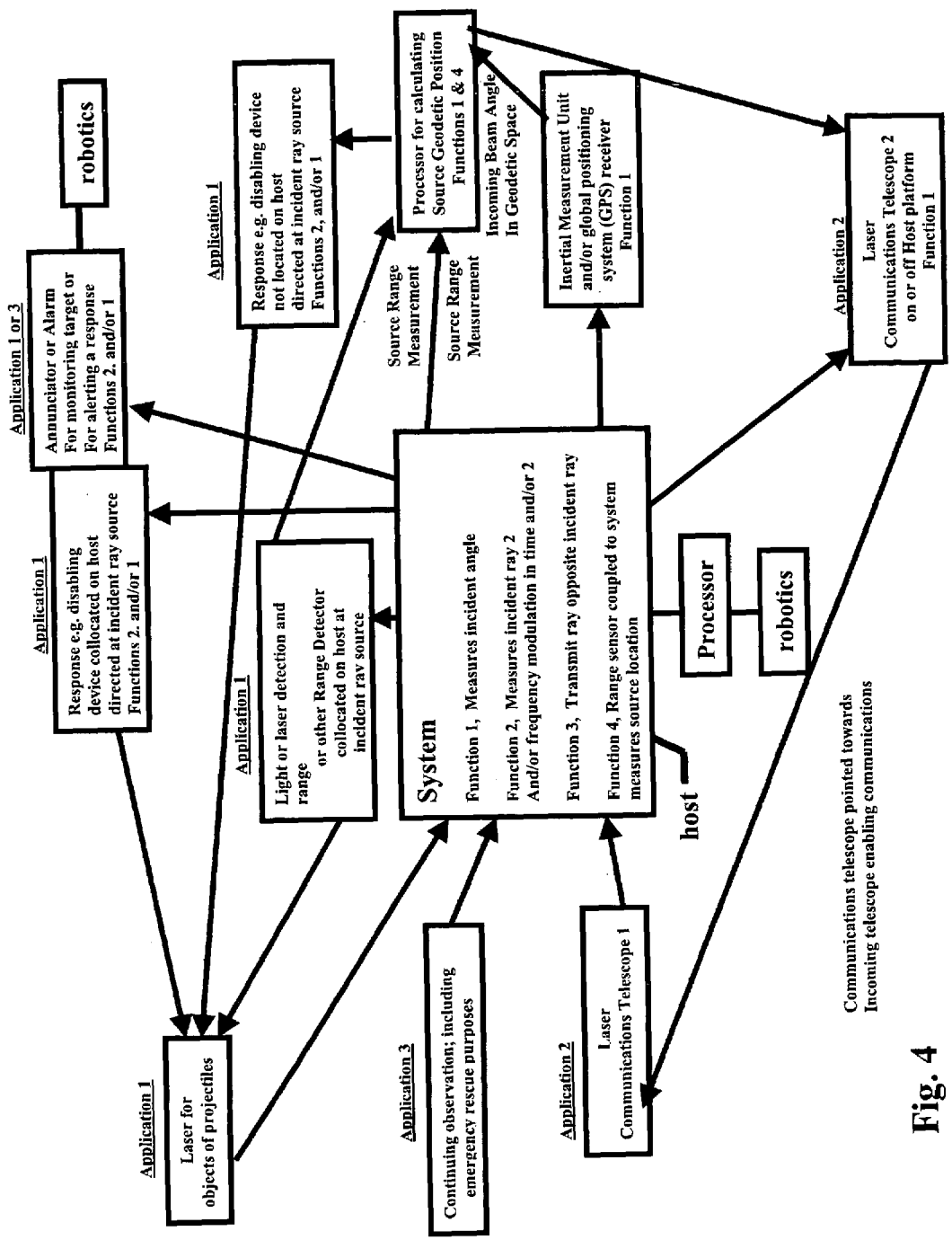
FIG. 4 is a multiapplication block diagram representing apparatus and procedures, using the apparatus embodiments of FIGS. 1 through 3 for the above-mentioned and still other functions, and in a number of variegated applications.

The sensor system is ordinarily located on a host (FIG. 4). An appropriate host is readily selected to optimize use of the invention for particular applications. In preferred embodiments, the host can be a vehicle including an automobile or truck, sea vessel, airplane, spacecraft, satellite or projectile, or even simply a human or animal or their paraphernalia. Hosts are not limited to these examples, but can basically consist of any carrier—even a stationary one—capable of supporting and maintaining the sensor, and exposing it to various kinds of articles or objects.

The sensor method or system specifications can vary and be optimized for use in particular applications. One of ordinary skill in the art can be select preferred configurations of the system to suit a particular application. In preferred embodiments of the invention, the system can monitor a field of regard at approximately 10 Hz frame rate—evidencing the excellent sensitivity of the invention at high frequencies. The invention is capable, however, of monitoring in a range on the order of 1 Hz to 1 kHz—or even 10 kHz, depending on size of articles of interest, and the detector field of view. Overall, the invention provides a high degree of angular accuracy in determining the approach path of an incident ray.

Plural such sensor systems can be grouped and coordinated to provide up to 4 π steridan coverage—i.e., for sensing in all directions at once. This kind of observation is appropriate for a host that is in the air or in outer space, and in some circumstances for a host that is waterborne. For a host on land, and for a water-surface-craft host in other circumstances (particularly, no need to monitor below the water surface) 2 π steradian coverage ordinarily is entirely sufficient.

The sensor of the invention has the ability to monitor wavelengths ranging from ultraviolet (UV) to infrared (IR), particularly up to the midIR range.

Typically a MEMS mirror is limited in range to plus-or-minus ten to fifteen degrees about one or two orthogonal axes, i.e. through an overall excursion 16 of roughly 20° (FIG. 5) to 30° for each axis. In preferred embodiments of the invention, as noted earlier, a lens assembly 14 is advantageously used to significantly increase this range optically.

Most preferred embodiments of the invention eliminate the use of large external scan mirrors and gimbals; as a result the invention is more rugged, and yet actually less expensive and several orders lighter and more compact than conventional sensor systems. For example, the size of the system, depending on the application, is on the order of one millimeter, or less, to a few centimeters—rather than on the order of one centimeter to tens of centimeters as described earlier for conventional units.

Dimensions of an oscillating scan mirror 15 may be, merely by way of example, in a range from a few tens of microns wide to several millimeters or more; such a mirror may be roughly square, or may have a high aspect ratio such as 25:1 or 50:1. Nominally and ideally, however, the aspect ratio should be approximately the square root of two, since the mirror surface—when at the center of its range of excursions—is inclined at 45° to both the incident and reflected beams. Accordingly the most preferable tested embodiments use e.g. silicon scan mirrors in the range of 1.5×2.1 mm (note that $1.5\sqrt{2} \approx 2.1$); but again these dimensions are not at all limiting. Such a mirror typically rotates about its own axis with an excursion in the range of ±1° to ±10°—or even ±15° as previously noted.

The system mass can be made just one-tenth to one kilogram, also generally several orders of magnitude lower than that of comparable known devices. Angular resolution is readily placed in the submilliradian or even tens-of-microradians range, i.e. less than three minutes of arc or even under one minute, versus the previously noted tens to hundreds milliradians (two-thirds of a degree to tens of degrees) for sensors heretofore. Yet another major and remarkable advantage of the invention is that the system can eventually use off-the-shelf technology, requiring no expensive custom parts or instrumentation.

Initially, the most highly preferred embodiments of the invention call for a custom MEMS mirror array of at least 5×5 mirrors —and more preferably 10=10 and even 30×30 mirrors—each individual mirror being 1.5×2.1 mm, and with an afocal lens assembly that follows custom optical specifications but is otherwise conventionally fabricated. It is anticipated that these component designs will quickly become standard in the field, and very shortly be available as commercial off-the-shelf units.

Figure 3:
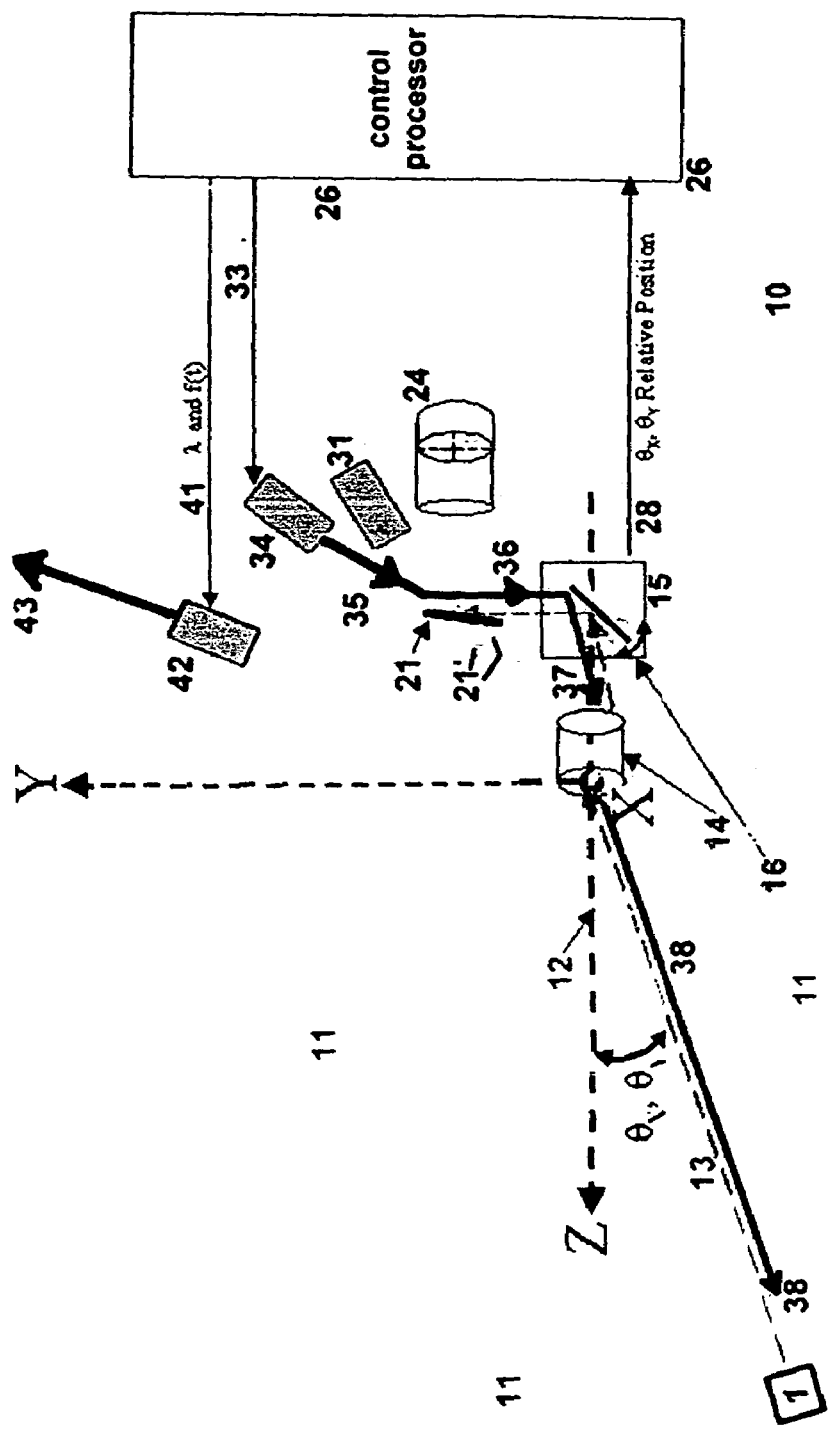
FIG. 3 is another like diagram but now showing a further extension to encompass dual forms of yet a third function, namely response.

The invention can redirect a new beam 43 (FIG. 3) of light (usually generated locally—i.e. on the same platform) laterally for guidance of any objects away from the host. The invention can also provide determination of wavelength λ and frequency-modulation information f(t) in the received beam, so that those characteristics of the received eays can be mimicked 41 in the new beam—which is relayed to another location, either for communications purposes or to lead an approaching object to a different destination. Alternatively the new beam can be directed back along ths same path 38 as received rays 13, to the extent that the field of ergard of the optical system (or of the system together with other such optical systems being operated in parallel) is broad enough to provide appropriate directions for the new beam. These capabilities are entirely beyond those of the prior art, Preferred embodiments of the method of the invention, corresponding to the apparatus discussed above, include the steps or functions of:

detection and angular location of a light source (FIG. 1), determining characteristics of the received radiation (FIG. 2), and response (FIG. 3).

The first of these functions preferably includes these constituent steps:

STEP 1 —Incident rays 13 from a light source 1 illuminate the system, on its host platform, at a relative angle $\theta_x$, $\theta_y$.

STEP 2 —A afocal lens assembly 14 reduces a collimated or nomially collimated incident or exciting ray angle, $\theta_x$, $\theta_y$ (i.e., outside the optical system) by the ratio of the two focal lengths designed into the assembly, 1:3 in this example, resulting in much smaller off-axis angles of $\theta_x/3$, $\theta_y/3$ inside the optical system 10—i.e. at the scan mirror or mirrors 15. This arrangement is optimal to effectively, or virtually, bring the incident rays within the native scan range of the MEMS scan system.

The lens assembly 14 is described as "afocal" because it is not used to focus the incoming rays directly onto the detector 24; rather the primary lens 45 forms (inside the lens assembly) only a virtual image 44, which the secondary lens 46 then recollimates—but only if the incoming beam 13a, 13 is itself at least approximately collimated—to produce substantially parallel rays in the beam approaching the detector assembly 22.

STEP 3—The MEMS scan mirror continously raster-scans the field of regard. When the MEMS scan mirror intercepts laser energy at the corresponding original $\theta_x$, $\theta_y$ (and reduced angles $\theta_x/3$, $\theta_y/3$), the detector detects the energy and in turn transmits the signal to the control processor. The relative position reported at that same instant by the MEMS scan mirror has benn precalibrated to provide the corresponding field of regard ($\theta_x$, $\theta_y$) relative to the optical axis.

STEP 4—The 2-D detector is fitted with a reimaging lens that focuses the incident beam at its conjugate location on the detector, relative to the system axis, provided that (1) the MEMS scan mirror is at an appropriate angle to direct the beam into the detector field of view, and (2) the incoming beam, within the envelope of extreme captured rays 13, 13a (FIG. 5), is collimated or very nearly so. This arrangement tends to somewhat diffuse the image of relatively nearby sources on the detector, and thus limit the response to light from relatively remote sources.

The detector is thus aided in essentially disregarding illumination from nearby sources, which for purposes of preferred embodiments of the present invention are deemed to be mosttypically irrelevant. (As will be understood, contrary assumptions can be implemented instead, if desired, in other—generally conventional—optical trains.) Such exclusion of illumination that is not of interest, however, is generally secondary in relation to other selective features in the system—e.g. spectral filtering 21, CCD or other imager 55, and a. c. signal filtering 56 or other arrangements for enhancing sensitivity to anticipated known modulation patterns.

The position-sensing detector next comes into play, sensing not only presence of the illumination but also the displacements $\Delta X$, $\Delta Y$ of its focal point (conjugate location) from the optical axis—and generating corresponding $\Delta X$, $\Delta Y$ signals for transmission to the control processor.

STEP 5—Mirror-bias commands $\Delta\theta_x$, $\Delta\theta_y$, proportional to the $\Delta X$, $\Delta Y$ values, are generated by the control processor and sent to the MEMS scan-mirror assembly. These signals drive the conjugate location approximately to the optical axis; and as that location approaches the axis the error signals $\Delta X$, $\Delta Y$ become progressively more linear and stable, by virtue of the inherent behavior of the PSD 24, so that the eventual determination of incident-beam location is extremely precise, accurate, and stable. At each instant the source angles outside the optical system are related to the coordinates on the PSD surface by the final-stage focal length, i.e. each angle $\Delta\theta_x$ or $\Delta\theta_y$ equals the corresponding $\Delta X$ or $\Delta Y$ coordinate divided by the 2-D detector imaging-optic focal length $f_D$ (FIG. 5)—subject to the angle-scaling effect of the afocal assembly 14, discussed at "step 2" above.

STEP 6—The $\Delta\theta_x$, $\Delta\theta_y$ incident-ray relative position as then measured by the MEMS scan-mirror local angle sensors are made available, for later functions, as an accurate line-of-sight location of the incident ray relative to the system axis.

The second function of the system basically includes determining the wavelength and any accompanying temporal or spectral modulation of the incident ray or signal. Continuing the above sequence:

STEP 7—A fold mirror 21 (FIG. 2) rotates to direct the incident beam 13 to a spectrometer or photodiode 31. The fold mirror is basically a simple, motorized mirror that can be replaced by a MEMS mirror or, as noted earlier, a beam splitter. One or more splitters, in tandem as appropriate, are particularly advantageous to permit simultaneous operations of different probing, or active response—and combinations of these.

STEP 8—A spectrometer 31 determines the incident ray wavelength; and either the detector in the spectrometer acquires any temporal or spectral intensity or wavelength or temporal modulation to be detected and sent 32 to the control processor. Portions of this task may be assigned to the PSD 24, filter 56 (FIG. 1) and processor 26 for data acquisition during earlier steps 5 and 6.

The third system function is most typically an optical response that can take any of several forms. One such form (FIG. 3), which makes use of the directional information collected in the first function, is generation and projection of a very bright beam of radiation opposite the incident ray, to temporarily dazzle or confuse an operator or aiming-control apparatus at the source. Again continuing from the first-function sequence:

STEP 7—The fold mirror 21 (FIG. 3) rotates from its earlier positions 21' to align a powerful laser 34 along the optical axis, and thereby along the known path to the source.

STEP 8—The laser transmits a temporarily blinding beam 35-38 in a direction opposite the incident rays 13, but back along the same path, in response to a command 33 from the control processor 26.

A fourth function uses the information collected in the second function to generate and project a precisely wavelength-matched and temporal-modulation-matched beam to a nearby location, preferably one that progressively moves away from the host position, to draw any guided object away from the heat. Friendly as well as hostile guided rendezvous can be facilitated in this way. This fourth function includes issuance of a processor command 41 (FIG. 3)—with necessary data λ, f(t)—to the auxiliary light source, e.g. tunable modulated laser 42. At substantially the same time the determined information is advantageously transmitted (preferably as interpreted, encoded data) to a remote station to document, e.g. for subsequent refined avoidance, what has occurred.

As will be understood, if the application at hand calls for directing a beam into the originally searched input volume 11, rather than a location laterally offset from that volume, then instead of the auxiliary laser 42 it is possible to use the previously mentioned laser 34—i.e., the one that can be aligned with the main optical path through the lens assembly 14. This option is particularly pratical in the case of a plural-sensor-system apparatus configured to scan 2π or 4π steradians as previously discussed. In such applications of at least some one of the component sensor system.

A complex of other possible responses, and alternative applications of the information gathered in the first two functions, is within the scope of the invention (FIG. 4). One such response is initiation of a distance probe operation to collect additional information about any such object that may be associated with the beam, or about facilities at the source, or both. Several of the references cited at the beginning of this document provide very extensive information about distance-determining capabilities and design. Other ranging methods may be substituted as desired. this form of the invention can also be used for any of various other applications, such as for example transmisson of modulated optical signals for free-space laser communications.

For each of the various applications additional components may be added, such as additional processing capability for further processing data, an annunciator for alerting an operator or connecting to an alarm for monitoring the system, or robotics for performing additional functions in response to the detection.

Particularly preferred applications, as shown, include use of the system in a vehicle or other host for detection of objects, or use of the system as a guide for laser communications telescope—for which the system "communicates" angular, wavelength, frequency-modulation (or other temporal modulation) or other information between two telescopes. Also included is use of the system for continuous observationpurposes such as recognition and location of emergency distress signals e.g. a beacon, or flares, or identification of approaching vehicles.

Furthermore the system can detect such light signals in outer space or even through large bodies of water. Thus objects can be identified and located regardless of whether they are floating in space, under the sea or on land. Other beneficial uses will appear from the drawing; however, it is to be understood that FIG. 4 is not intended to be exhaustive; i.e., not all functions of the invention described and discussed in this document appear in that drawing.

Because of the versatility of the system and its many functions, it has a wide range of applications spanning industries as diverse as telecommunications, optics, automotive, amrine, aerospace, continuing observation, and search and rescue.

In a particularly preferred embodiment of the system, the sensor system utilizes a two-axis scan mirror (FIG. %) of dimensions 1.5×2.1 mm, with mechanical scan angle of plus-or-minus 10° to 15° —for a total excursion of 20° to 30° —about both axes, A two-axis scan mirror with a 2-D detector, however, allows greater flexibility in detecting throughout a volume or detecting in more than one dimension.

The ±10° ot ±15° sweep 16, i.e. 20° or 30° full-excursion, of the MEMS mirror or mirrors 15 is doubled—by the effect of reflection—to produce a 40° or 60° deflection of the beam at that point. The MEMS system, in turn, is behind a lenss assembly whose focal-length ratio (typically 1:3) triples that 40° or 60° deflection to provide, typically, a 120° to 180° overall field of regard. The two-axis MEMS scan mirror, operating at approximately four milliradians for approximately the magnification (again, typically three) times 2λ/d, repeatedly sweeps the full 120° ×120° volume at more than 10Hz. This then is the frame rate for a complete scan of that field of regard.

If a collimated or nomially collimated incident ray is directed toward the host within this overall filed of view, the ray is projected—through its reimaging lens—onto the detector when the MEMS two-axis scanning mirror is at the corresponding angular position. The MEMS scan-mirror control system then drives the scan mirror to maintain the incident ray on the detector, ideally a position-sensing photodiode detector as described earlier—and preferably at its center.

This detector provides positional closed-loop feedback to the scan mirror, driving the focal point to minimize the ΔX and ΔY coordinates. In other words the beam is driven to the native origin on the photosensitive surface of the diode.

When in that condition, the sngular positions of the mirror provide the corresponding azimuth and elevation angles $\Delta\theta_x$, $\Delta\theta_y$ of the incident rays—based on the corresponding error coordinates ΔX, ΔY at the detector surface, and the corresponding known relative mirror angles as explained earlier. Limiting uncertainty of the input collimated laser-beam angle is the limiting resolution of the 2-D detector divided by the reimaging lens focal length $f_D$.

In addition to illuminating the PSD, the system advantageously includes a multiposition relay mirror (or fold mirror etc.) to alternatively direct the incident beam to other detectors such as a spectrometer to do so concurrently. If preferred, quad cells, focal plane arrays, or line arrays such as a charge-coupled device (CCD) or other light sensitive arrays can be used instead. Ideally each ndividual detector of an array can be provided with its own individual microlens. Nevertheless the previously mentioned quantization effect remains a concern, and array detectors are generally slower than PSDs, particularly when taking into account the necessary algorithmic procedures for readout and interpretations of optical signals.

These same multiposition mirror can also serve to route output rays, from an onboard laser or other bright lamp, back along the original optical path toward the source of the initially detected incident beam—to blind the source operator, or locate the source facility, or communicate with it, all as set forth earlier.

In practice of many of the preferred embodiments of the invention—but particularly for situations in which the system cannot lock on to an active source, usually because no active optical source is present or none is being concurrently detected and tracked—it is especially helpful to provide a vibration-sensing subsystem 57 (FIGS. 1 and 2) adjacent to the scan mirror or mirrors, and a correctional-data path 58 for flow of vibration information from the outputs of these sensors to the main processor. (Although included in FIG. 1, such provisions most typically are in order only when no positional detection is available, e.g. as in FIG. 2 with the detector 24 out of service, or absent. Vibration sensing 57, 58 and input filtering 55, 56 are omitted from FIGS. 3 and 5 only to avoid further clutter in those drawings.) This sensing module 57 with its correction path 58 enables a spectrometer, or an imaging system or distance-determining system, that is part of the invention embodiments to form a stable, high-resolution 2-D or 3-D image despite vibration in the host platform.

Most typically the vibration sensor includes a gyroscope or set of accelerometers, separated by know lever arms. These devices provide enough information—most typically wit hrespect to five degrees of freedom—to enable the sytem to incorporate compensating maneuvers of its moving mirrors, canceling out the effects of such vibration. These devices should be augmented by a GPS sensor for geodetic coordinates Sensing elements 57 positioned along the plane of a supporting base of the moving mirror or mirror assembly 15 can for example include three linked accelerometers sensitive to motion normal to that plane, and two others sensitive to motion within that plane—ordinarily but not necessarily parallel t oorthogonal edges of the base. Such vibration-sensing devices in effect define instantaneous characteristics of any host-platform vibration. Such sensing subsystems in themselves are well known and contentioanl. The data they produce must flow to the processor 26 and be interpreted promptly enough to enable effective feedback into the control circuits of the moving mirror or mirrors, to achieve cancellation within the desired imaging accuracy of the overall system.

Figures 5, 6:
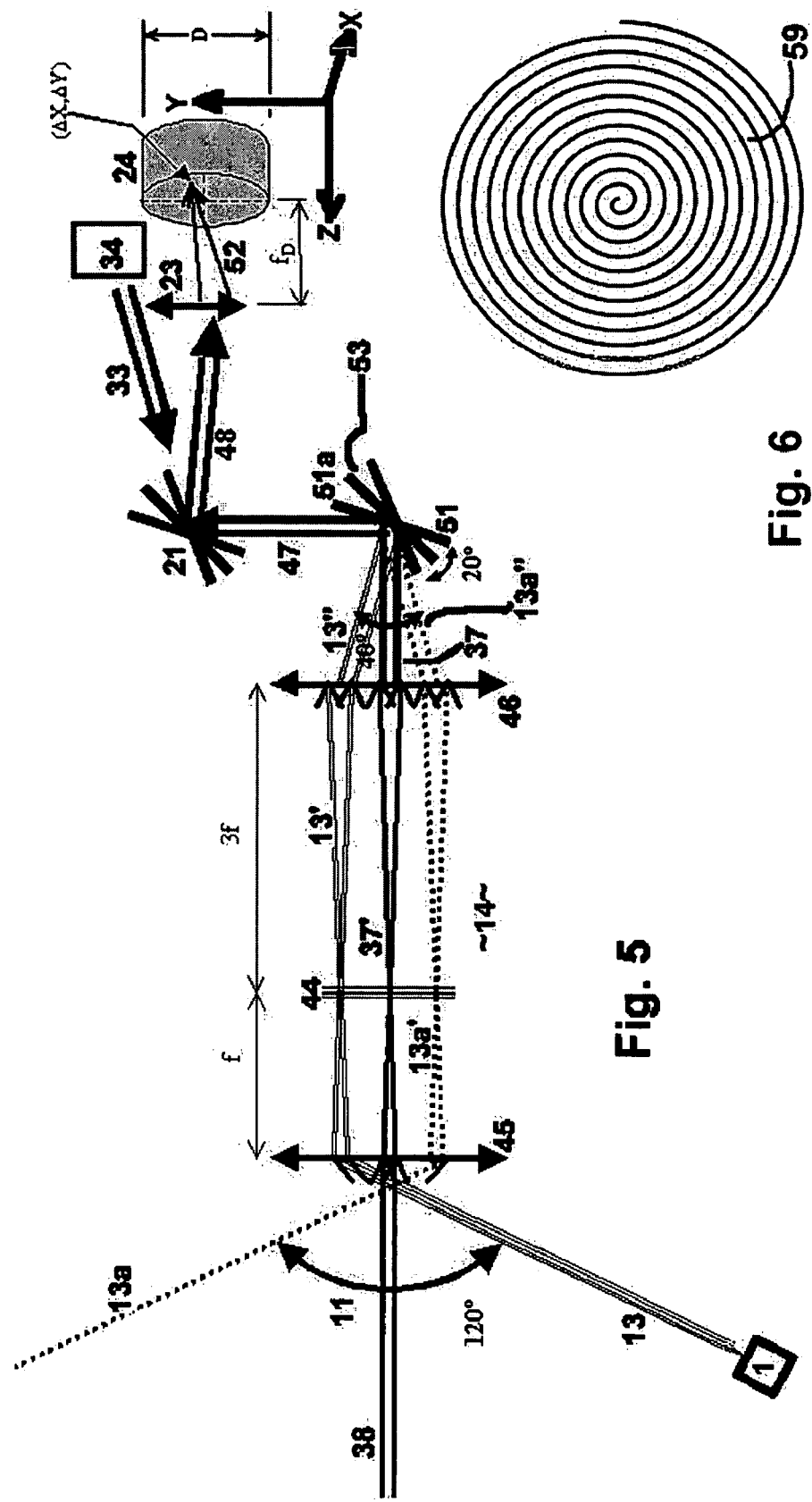
FIG. 5 is a diagram generally like FIGS. 1 through 3 but with the lens and detector assemblies 14, 22 enlarged for presentation of details.
FIG. 6 is a diagram conceptually representing a spiral-scanning raster pattern for use in any of the FIG. 1 through FIG. 5 systems and methods.

For most purposes of the present invention, as previously mentioned, raster scans are advantageously performed using a spiraling pattern 58 (FIG. 6). With moving mirrors, executing such a pattern is most typiaclly far more energy-efficient and fast than tracing a more-conventional rectangular-envelope serpentine pattern. For optimum speed and efficiency the sequence reverses direction at each end—i.e., outward in one scan, inward in the next, and so forth. As in any raster operation, the number and pitch of the spiral revolutions should be selected with care to obtain good resolution without significant gaps in the image.

In accompanying apparatus claims generally the term "such" is used (instead of "said" or "the") in the bodies of the claims, when reciting elements of the claimed invention, for referring back to features which are introduced in preamble as part of the context or environment of the claimed invention. The purpose of this convention is to aid in more particularly and emphatically pointing out which features are elements of the claimed invention, and which are parts of its context—and thereby to more distinctly claim the invention.

What is claimed is:

1. An optical system for dynamically determining radiation characteristics, including associated angular direction throughout a specified range of angular directions, of an external article in a volume outside the system; said optical system comprising:
   an optical detector;
   an entrance aperture;
   an afocal element, associated with the aperture, for enlarging the field of regard of such external article and such volume as seen by the detector; and
   disposed along an optical path between the detector and the entrance aperture, at least one mirror, rotatable about plural axes, for causing the detector to address varying portions of such volume outside the optical system;
   each mirror of the at least one mirror having dimensions in a range from thirty microns to five millimeters;
   wherein, due to said enlarging of the field of regard together with rotation of the at least one mirror, such external article is visible to the detector throughout the specified range, substantially without changing magnitude of said enlarging.

2. The optical system of claim 1, wherein:
each mirror of the at least one mirror is a microelectromechanical mirror.

3. The optical system of claim 1, wherein:
the afocal element is an afocal lens assembly disposed at the aperture, and amplifies the varying introduced by the at least one mirror.

4. The optical system of claim 3:
wherein the afocal lens assembly does not focus such external article onto any solid element of the optical system; and
further comprising a focusing lens, associated with the detector, for:
   intercepting a radiation beam that has passed through the afocal lens assembly, and that also has been reflected by the at least one mirror, and
   focusing rays, in said radiation beam, from such external article onto the detector.

5. The optical system of claim 1, wherein:
the afocal enlarging element is disposed generally at the aperture.

6. The optical system of claim 1, wherein:
the afocal enlarging element defines the aperture.

7. The optical system of claim 1:
further comprising an imaging module; and
wherein the afocal enlarging element and the at least one mirror are shared by both:
   the imaging module, and
   the detector with its focusing lens.

8. The optical system of claim 1:
further comprising a spectral-analysis module; and
wherein the afocal enlarging element and the at least one mirror are shared by both:
   the spectral-analysis module, and
   the detector with its focusing lens.

9. The optical system of claim 1:
further comprising an auxiliary optical system that includes at least one of:
   a ranging laser for projecting a ranging beam to such article, and
   a ranging-laser receiving module, distinct from the aforesaid detector with its focusing lens, for receiving and analyzing the ranging beam after reflection from such article; and
wherein the afocal enlarging element and the at least one mirror are shared by both:
   one or both of the ranging laser and receiving module, and
   the detector with its focusing lens.

10. The optical system of claim 1:
further comprising an auxiliary optical system that includes at least one of:
   a communication-beam transmission module for transmitting a first modulated communication beam toward such article, and
   a communication-beam reception module, distinct from the aforesaid detector with its focusing lens, for receiving and interpreting a second modulated communication beam received from such article or from a region of such volume that includes such article; and wherein the afocal enlarging element and the at least one mirror are shared by both:
one or both of the transmission and reception modules, and
the detector with its focusing lens.

11. The optical system of claim 1:
further comprising an auxiliary optical system that includes at least one of:
a communication-beam transmission module for transmitting a first modulated communication beam toward such article, and
a communication-beam reception module for receiving and interpreting a second modulated communication beam received from such article or from a region of such volume that includes such article; and
wherein the afocal enlarging element and the at least one mirror are shared by one or both of the transmission and reception modules.

12. The optical system of claim 1:
further comprising a powerful laser for projecting a beam to impair function or structural integrity of such article; and
wherein the afocal enlarging element and the at least one mirror are shared by both:
the powerful laser, and
the detector with its focusing lens.

13. The optical system of claim 1:
further comprising a laser for dazzling or confusing either a human operator or optical apparatus associated with such article, or both; and
wherein the afocal enlarging element and the at least one mirror are shared by both:
the dazzling laser, and
the detector with its focusing lens.

14. The optical system of claim 1:
wherein the detector reports relative location of incident radiation on a sensitive surface of the detector; and
further comprising means for automatically responding to the detector by actively servocontrolling the at least one mirror to substantially center an image of a detected source on the detector.

15. The optical system of claim 14, wherein the external article comprises a radiation source of a particular type, said characteristics comprise existence and presence of the source, and the optical system is for detecting the source and determining its angular location, and:
said optical detector is a detector for such radiation from such source of such particular type; and
further comprising means for automatically responding to the detector by actively servocontrolling the at least one mirror to substantially center an image of a detected source on the detector.

16. The optical system of claim 15, further comprising:
means for reading and interpreting angular position from mirror position feedback signals while the image is substantially centered on the detector.

17. The optical system of claim 16, wherein:
the responding means comprise means for continuing to servocontrol the at least one mirror to track the already-detected source substantially at the detector center.

18. The optical system of claim 17, wherein:
the at least one mirror comprises plural mirrors; and
the continuing means comprise means for using one or more mirrors to track the already-detected source, and one or more other mirrors to instead simultaneously perform another function.

19. The optical system of claim 18, wherein:
the other function comprises searching for another source, previously not yet detected.

20. The optical system of claim 18, wherein:
the other function comprises operating the auxiliary optical system with respect to said already-detected source or another article or scene.

21. The optical system of claim 17, further comprising:
operating a beam-splitter to enable use of an auxiliary optical system, with respect to said alreadydetected source or another article or scene, simultaneously with said continuing tracking of the already-detected source.

22. The optical system of claim 1, wherein:
the detector is a position-sensing detector (PSD).

23. The optical system of claim 1, wherein:
the detector is a quad cell.

24. The optical system of claim 1, further comprising:
means for substituting a detector array for the detector, to image the already-detected source or associated articles, or both.

25. The optical system of claim 1, further comprising:
means for directing a response toward the detected article or an article associated therewith, or both.

26. The optical system of claim 25, wherein:
the response-directing means comprise means for emitting a beam of radiation that uses said entrance aperture as an exit aperture and is reflected from said at least one mirror;
wherein the response-directing means share, with such radiation from such source, both:
said entrance aperture, and
said at least one mirror.

27. An optical system for dynamically determining radiation characteristics, including associated angular direction, of an external article in a volume outside the system; said optical system comprising:
an optical detector;
an entrance aperture;
an afocal optically powered element, associated with the aperture, for enlarging the field of regard of such external article and such volume as seen by the detector; and
wherein the afocal element does not focus such external article onto any solid element of the optical system;
disposed along an optical path between the detector and the entrance aperture, at least one mirror, rotatable about plural axes, for causing the detector to address varying portions of such volume outside the optical system and with the enlarged field of regard produced by the afocal element;
a focusing lens, associated with the detector, for:
intercepting a radiation beam that has passed through the afocal element, and that also has been reflected by the at least one mirror, and
focusing rays, in said radiation beam, from such external article onto the detector;
wherein the afocal element and mirror cooperate with the focusing lens and detector, to image such article onto the detector.

28. The optical system of claim 27, wherein:
the afocal enlarging element is disposed generally at the aperture.

29. The optical system of claim 27, wherein:
the afocal enlarging element defines the aperture.

30. The optical system of claim 27:
further comprising an imaging module; and
wherein the afocal enlarging element and the at least one mirror are shared by both:
the imaging module, and
the detector with its focusing lens.

31. The optical system of claim 30, wherein:
each mirror of the at least one mirror has dimensions in a range from thirty microns to five millimeters.

32. The optical system of claim 27:
further comprising a spectral-analysis module; and
wherein the afocal enlarging element and the at least one mirror are shared by both:
the spectral-analysis module, and
the detector with its focusing lens.

33. The optical system of claim 32, wherein:
each mirror of the at least one mirror has dimensions in a range from thirty microns to five millimeters.

34. The optical system of claim 27:
further comprising an auxiliary optical system that includes at least one of:
a ranging laser for projecting a ranging beam to such article, and
a ranging-laser receiving module, distinct from the aforesaid detector with its focusing lens, for receiving and analyzing the ranging beam after reflection from such article; and
wherein the afocal enlarging element and the at least one mirror are shared by both:
one or both of the ranging laser and receiving module, and
the detector with its focusing lens.

35. The optical system of claim 34, wherein:
each mirror of the at least one mirror has dimensions in a range from thirty microns to five millimeters.

36. The optical system of claim 27:
further comprising an auxiliary optical system that includes at least one of:
a communication-beam transmission module for transmitting a first modulated communication beam toward such article, and
a communication-beam reception module, distinct from the aforesaid detector with its focusing lens, for receiving and interpreting a second modulated communication beam received from Buch article or from a region of such volume that includes such article; and
wherein the afocal enlarging element and the at least one mirror are shared by both:
one or both of the transmission and reception modules, and
the detector with its focusing lens.

37. The optical system of claim 36, wherein:
each mirror of the at least one mirror has dimensions in a range from thirty microns to five millimeters.

38. The optical system of claim 27:
further comprising a powerful laser for projecting a beam to impair function or structural integrity of such article; and
wherein the afocal enlarging element and the at least one mirror are shared by both:
the powerful laser, and
the detector with its focusing lens.

39. The optical system of claim 38, wherein:
each mirror of the at least one mirror has dimensions in a range from thirty microns to five millimeters.

40. The optical system of claim 27:
further comprising a laser for dazzling or confusing either a human operator or optical apparatus associated with such article, or both; and
wherein the afocal enlarging element and the at least one mirror are shared by both:
the dazzling laser, and
the detector with its focusing lens.

41. The optical system of claim 40, wherein:
each mirror of the at least one mirror has dimensions in a range from thirty microns to five millimeters.

42. The optical system of claim 27:
wherein the detector reports relative location of incident radiation on a sensitive surface of the detector; and
further comprising means for automatically responding to the detector by actively servocontrolling the at least one mirror to substantially center an image of a detected source on the detector.

43. An optical system for dynamically determining radiation characteristiCs, including associated angular direction, of an external article in a volume outside the syBtem; said optical system comprising:
an optical detector;
an entrance aperture;
an afocal optically powered element, disposed generally at the aperture, for reducing the field of regard of such external article and such volume as seen by the detector; and
wherein the afocal reducing element does not focus such external article onto any solid element of the optical system;
disposed along an optical path between the detector and the entrance aperture, at least one mirror, rotatable about plural axes, for causing the detector to address varying portions of such volume outside the optical system and with the reduced field of regard produced by the afocal reducing element;
a focusing lens, associated with the detector, for:
intercepting a radiation beam that has passed through the afocal reducing element, and that also has been reflected flected by the at least one mirror, and
focusing rays, in said radiation beam, from such external article onto the detector;
wherein the afocal reducing element and mirror cooperate with the focusing lens and detector, to image such article onto the detector.

44. The optical system of claim 43:
further comprising an auxiliary optical system that includes at least one of:
a communication-beam transmission module for transmitting a first modulated communication beam toward such article, and
a communication-beam reception module, distinct from the aforesaid detector with its focusing lens, for receiving and interpreting a second modulated communication beam received from such article or from a region of such volume that includes such article; and
wherein the afocal reducing element and the at least one mirror are shared by both:

the detector with its focusing lens, and
one or both of the transmission and reception modules.

45. The optical system of claim 43, wherein:
each mirror of the at least one mirror has dimensions in a range from thirty microns to five millimeters.

46. The optical system of claim 43:
wherein the detector reports relative location of incident radiation on a sensitive surface of the detector; and
further comprising means for automatically responding to the detector by actively servocontrolling the at least one mirror to substantially center an image of a detected source on the detector.

47. The optical system of claim 43:
further comprising an auxiliary optical system that includes an imaging reception module, distinct from the aforesaid detector with its focusing lens, for receiving and interpreting an image beam received from such article or from a region of such volume that includes such article; and
wherein the afocal reducing element and the at least one mirror are shared by both:
the detector with its focusing lens, and
the imaging reception module.

* * * * *